US010723899B2

(12) United States Patent
Kohri et al.

(10) Patent No.: US 10,723,899 B2
(45) Date of Patent: Jul. 28, 2020

(54) FILM COMPRISING CORE-SHELL PARTICLES AND PRODUCT COMPRISING THE FILM

(71) Applicant: National University Corporation Chiba University, Chiba-shi, Chiba (JP)

(72) Inventors: Michinari Kohri, Chiba (JP); Ayaka Kawamura, Chiba (JP)

(73) Assignee: NATIONAL UNIVERSITY CORPORATION CHIBA UNIVERSITY, Chiba-Shi, Chiba (JP)

( * ) Notice: Subject to any disclaimer, the term of this patent is extended or adjusted under 35 U.S.C. 154(b) by 165 days.

(21) Appl. No.: 15/246,029

(22) Filed: Aug. 24, 2016

(65) Prior Publication Data

US 2017/0081535 A1  Mar. 23, 2017

(30) Foreign Application Priority Data

Sep. 23, 2015  (JP) .................................. 2015-186195

(51) Int. Cl.
*C09D 11/32* (2014.01)
*C09D 125/06* (2006.01)
(Continued)

(52) U.S. Cl.
CPC .............. *C09D 11/32* (2013.01); *C09D 11/03* (2013.01); *C09D 11/108* (2013.01); *C09D 125/06* (2013.01)

(58) Field of Classification Search
CPC ....... C09D 11/32; C09D 11/03; C09D 11/108; C09D 125/06
See application file for complete search history.

(56) References Cited

U.S. PATENT DOCUMENTS

| 2006/0078736 | A1* | 4/2006 | Fukazawa | .............. | B82Y 20/00 428/407 |
| 2010/0104810 | A1* | 4/2010 | Fukazawa | ............... | C03C 1/008 428/147 |
| 2014/0254017 | A1* | 9/2014 | Manoharan | ............ | B82Y 20/00 359/589 |

FOREIGN PATENT DOCUMENTS

JP    2004276492 A    10/2004
JP    2007169347 A     7/2007
(Continued)

OTHER PUBLICATIONS

Lin et al. ACS NANO vol. 8, No. 4, 3879-3883. Mar. 21, 2014. Multifunctional Fe3O4@Polydopamine Core-Shell Nanocomposites for Intracellular mRNA Detection and Imaging-Guided Photothermal Therapy. (Year: 2014).*

(Continued)

*Primary Examiner* — John E Uselding
(74) *Attorney, Agent, or Firm* — Flynn Thiel, P.C.

(57) ABSTRACT

An object of the present invention is to provide a film which has a high visibility in a solid state and a product which has the film, with a simple material composition. One aspect of the present invention is a film which comprises a core-shell particle which has a core and a shell which covers the core. Moreover, another aspect of the present invention is a product which is covered with the film. Further, another aspect of the present invention is a solution in which core-shell particles are dispersed. The present invention makes it possible to provide a film which has a high visibility in a solid state and a product which has the film, with a simple material composition.

4 Claims, 6 Drawing Sheets

(51) Int. Cl.
    *C09D 11/108*    (2014.01)
    *C09D 11/03*     (2014.01)

(56) References Cited

FOREIGN PATENT DOCUMENTS

| | | |
|---|---|---|
| JP | 2008274123 A | 11/2008 |
| JP | 2010058091 A | 3/2010 |

OTHER PUBLICATIONS

Sahin et al. Analyst, 2012, 137, 5654. Core-shell magnetic nanoparticles: a comparative study based on silica and polydopamine coating for magnetic bio-separation platforms. (Year: 2012).*

Zhou et al. ACS NANO vol. 9, No. 7, 6951-6960. Jun. 10, 2015. Versatile Core-Shell Nanoparticle@Metal-Organic Framework Nanohybrids: Exploiting Mussel-Inspired Polydopamine for Tailored Structural Integration. (Year: 2015).*

Nanoparticle-tuned structural color from polymer opals, by O. Pursiainen et al, Optics Express, Jul. 2007, vol. 15, No. 15, pp. 9553-9561.

Biomimetic Isotropic Nanostructures for Structural Coloration, by J. Forster et al, Advanced Materials, 2010, vol. 22, pp. 2939-2944.

Production of Colored Pigments with Amorphous Arrays of Black and White Colloidal Particles, by Y. Takeoka et al, Angewandte Chemie International Edition, 2013, vol. 52, pp. 7261-7265.

Production of Colourful Pigments Consisting of Amorphous Arrays of Silica Particles, by S. Yoshioka et al, ChemPhysChem Concepts, 2014, vol. 15, pp. 2209-2215.

Quasi-Amorphous Colloidal Structures for Electrically Tunable Full-Color Photonic Pixels with Angle-Independency, by I. Lee et al, Advanced Materials, 2010, vol. 22, pp. 4973-4977.

Structurally Coloured Secondary Particles Composed of Black and White Colloidal Particles, by Y. Takeoka et al, Scientific Reports, 3:2371, DOI:10.1038/srep02371, pp. 1-7.

Using Cuttlefish Ink as an Additive to Produce Non-iridescent Structural Colors of High Color Visibility, by Y. Zhang et al, Advanced Materials, 2015, vol. 27, pp. 4719-4724.

Biomimetic non-iridescent structural color materials from polydopamine black particles that mimic melanin granules, by M. Kohri et al, Journal of Materials Chemistry C, 2015, vol. 3, pp. 720-724.

Office Action issued by the Japanese Patent Office, from Corresponding application No. 2015-186195, dated Oct. 17, 2019 (4 pages).

* cited by examiner colloid crystal structure — angular dependence amorphous structure — non-angular dependence density of dopamine [g/L]
0    0.3    0.5    1.0    1.5    2.0

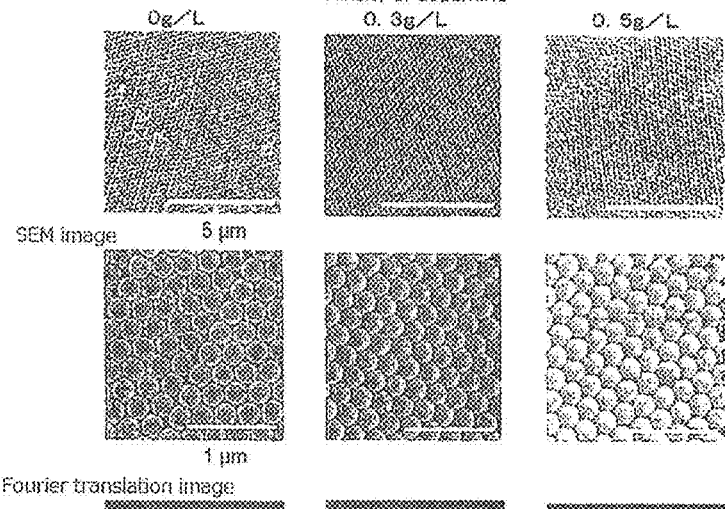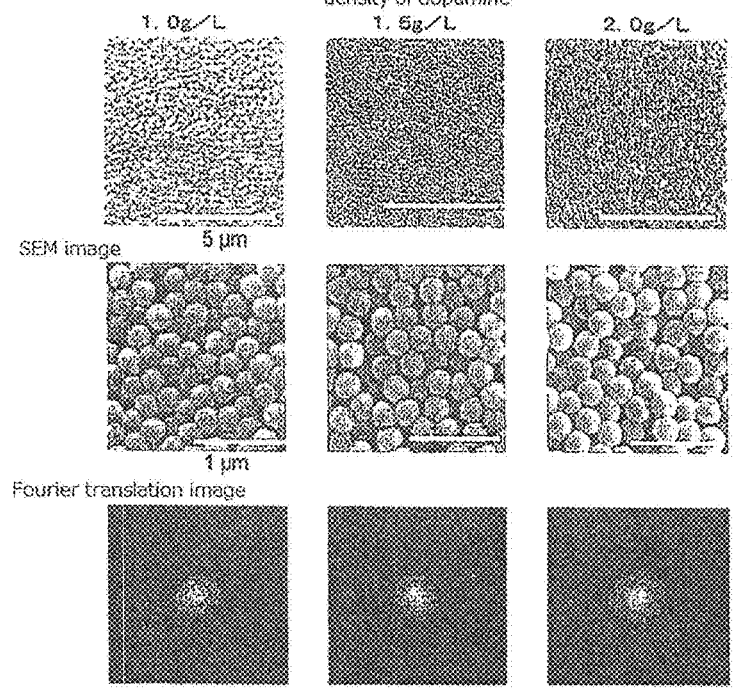

FILM COMPRISING CORE-SHELL PARTICLES AND PRODUCT COMPRISING THE FILM

TECHNICAL FIELD

The present invention rerates to a film which comprises core-shell particles, and a product which comprises the film.

RELATED ART

When a colloidal crystal structure, in which organic particles, inorganic particles or organic-inorganic composite particles with uniform diameters are regularly arranged, is constructed, a structural color with an angular dependence can be observed by light diffraction or interference caused from the arrangement of the particles.

Moreover, when an amorphous structure, in which organic particles, inorganic particles or organic-inorganic composite particles with a uniform diameter are irregularly arranged, is constructed, a structural color with a non-angular dependence can be observed.

Organic particles, inorganic particles or organic-inorganic composite particles with a uniform diameter are generally used for making a material which exhibits a structural color (hereafter referred to as "structural coloring material").

However, when the particles were used, there is a problem that the structural color became milky white and had a low visibility, by the scattering of light.

The addition of a black material, which absorbs the scattering of light, is proposed for improving the visibility in the case of using organic particles, inorganic particles and organic-inorganic particles.

As an example of the black material, carbon black is disclosed in the below-mentioned non-patent document 1-4. Further, iron oxide particles are disclosed in the below-mentioned non-patent document 5 and 6. Moreover, squid ink is disclosed in the below-mentioned non-patent document 7.

Moreover, in the below-mentioned non-patent document 8, an art for producing a structural coloring material, which is made by only poly-dopamine, is disclosed.

REFERENCE FOR RELATED ART

Non-Patent Document

NON-PATENT DOCUMENT 1 O. L. J. Pursiainenl et al., Optics Express, 2007, 15, 9553.
NON-PATENT DOCUMENT 2 J. D. Forester et al., Adv. Mater., 2010, 22, 2939.
NON-PATENT DOCUMENT 3 Y. Takeoka et al., Angew. Chem. Int. Ed., 2013, 52, 7261.
NON-PATENT DOCUMENT 4 S. Yoshioka et al., Chem. Phys. Chem., 2014, 15, 2209.
NON-PATENT DOCUMENT 5 I. Lee et al., Adv. Mater., 2010, 22, 4973.
NON-PATENT DOCUMENT 6 Y. Takeoka et al., Sci. Rep., 2013, 3, 2371.
NON-PATENT DOCUMENT 7 Y. Zhang et al., Adv. Mater., 2015, 32, 4719.
NON-PATENT DOCUMENT 8 K. Kohri et al., J. Mater. Chem. C, 2015, 3, 720.

DESCRIPTION OF THE INVENTION

Problems to be Solved by the Invention

However, as described in the above-mentioned non-patent documents 1-7, only organic particles, inorganic particles or organic-inorganic composite particles with a uniform diameter and additives such as carbon black, iron oxide particle and squid ink are disclosed.

On the other hand, in the above-mentioned non-patent document 8, the poly-dopamine as a black particle is disclosed. However, the visibility in a solid state is very low.

Accordingly, in consideration of the above-mentioned problem, an object of the present invention is to provide a film which has a high visibility in a solid state and a product which has the film, with a simple material composition.

Means for Solving the Problems

As a result of keen examination about the above-described problems, the inventors found that a structural color with a high visibility appeared by using core-shell particles which had a shell and core (the core was covered by the shell) and the present invention was made.

Namely, one aspect of the present invention which solves the above-mentioned problem is a film which comprises core-shell particles, wherein the core-shell particles have a core and a shell which covers the core.

Moreover, in this aspect, it is desirable that the diameter of the core-shell particle is 50 nm or more and 500 nm or less.

Moreover, in this aspect, it is desirable that the thickness of the shell is 0.5 nm or more and 50 nm or less.

Moreover, in this aspect, it is desirable that the color of said shell is browner or darker than said core.

Moreover, in this aspect, it is desirable that the core comprises an organic material or inorganic material.

Moreover, in this aspect, it is desirable that the inorganic material comprises at least one of silica, titania, and alumina.

Moreover, in this aspect, it is desirable that the organic material comprises at least one of a styrenic material and acrylic material.

Moreover, in this aspect, it is desirable that the film has a colloidal crystal structure in which said core-shell particles are regularly arranged.

Moreover, in this aspect, it is desirable that the film has an amorphous structure in which said core-shell particles are irregularly arranged.

Moreover, in this aspect, it is desirable that the film exhibits a structural color.

Moreover, another aspect of the present invention is a product which has a film, wherein the film comprises a core-shell particle, and the core-shell particle has a core and a shell which covers the core.

Moreover, in this aspect, it is desirable that the diameter of said core-shell particle is 50 nm or more and 500 nm or less.

Moreover, in this aspect, it is desirable that the thickness of the shell is 0.5 nm or more and 50 nm or less.

Moreover, in this aspect, it is desirable that the color of the shell is browner or darker than the core.

Moreover, in this aspect, it is desirable that the core comprises an organic material or inorganic material.

Moreover, in this aspect, it is desirable that the inorganic material comprises at least one of silica, titania, and alumina.

Moreover, in this aspect, it is desirable that the organic material comprises at least one of a styrenic material and acrylic material.

Moreover, in this aspect, it is desirable that the film has a colloidal crystal structure in which the core-shell particles are regularly arranged.

Moreover, in this aspect, it is desirable that the film has an amorphous structure in which the core-shell particles are irregularly arranged.

Moreover, in this aspect, it is desirable that the film exhibits a structural color.

Moreover, another aspect of the present invention is a solution in which core-shell particles are dispersed, wherein the core-shell particles have a core and a shell which covers said core.

Effects of the Invention

From the above description, the present invention realizes a film which has a high visibility in a solid state and a product which has the film, with a simple material composition.

BRIEF DESCRIPTION OF THE DRAWINGS

FIG. 8 shows a scanning microscope (SEM) image of the pellets of the example and a Fourier translation image of the SEM image.

FIG. 9 shows a scanning microscope (SEM) image of the pellets of the example and a Fourier translation image of the SEM image.

BEST MODE FOR CARRYING OUT THE INVENTION

Hereafter, embodiments of the present invention are described with reference to the drawings. However, the present invention can be accomplished with different embodiments and is not limited to the embodiments and examples described below.

Figure 1:
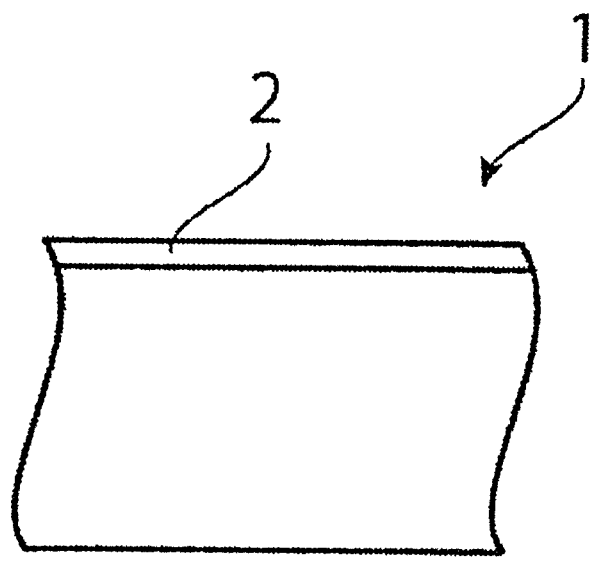
FIG. 1 shows a schematic cross-sectional drawing of a product of an embodiment.

FIG. 1 shows a schematic cross-sectional drawing of a near surface of a product (hereafter referred to as "the product") 1 of this embodiment.

As shown in FIG. 1, the product 1 has a film 2 which comprises core-shell particles which has a core and a shell which covers the core.

Figure 2:
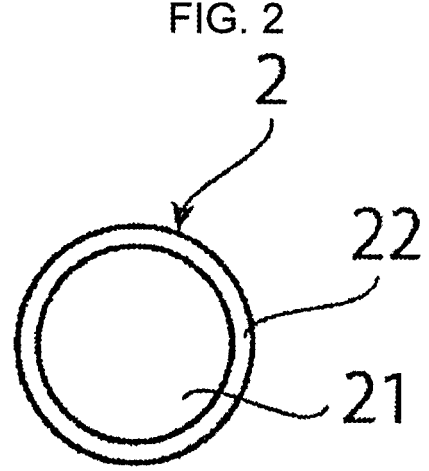
FIG. 2 shows a schematic cross-sectional drawing of a core-shell particle of the embodiment.
Figure 3:
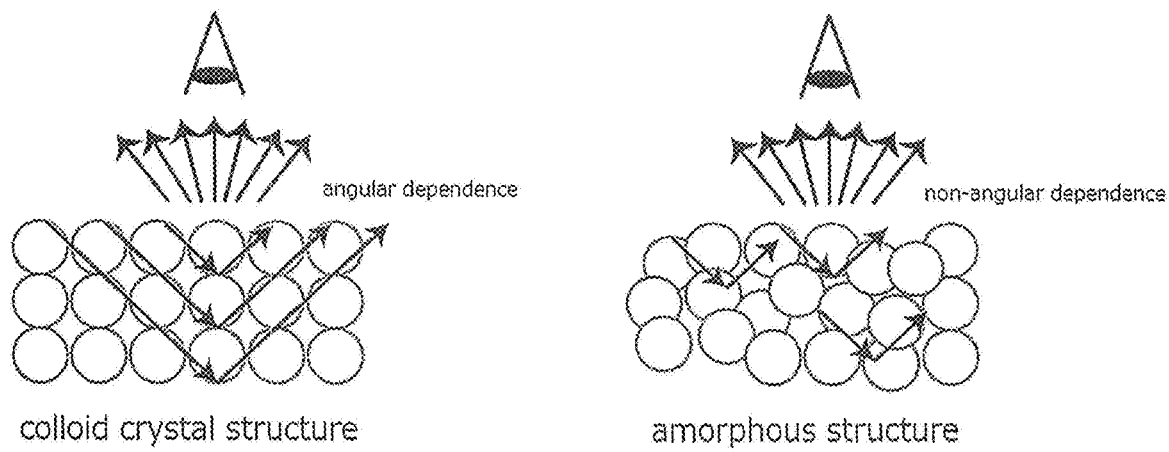
FIG. 3 shows a conceptual drawing of a principle of a structural color which is exhibited by the film of the embodiment.

FIG. 2 shows a schematic cross-sectional drawing of a core-shell particle which is contained in the film 2 of this embodiment.

As shown in FIG. 2, the film 2 comprises a core 21 and a shell 22 which covers the core 21.

By regular or irregular arrangement of the core-shell particles, the film 2 of this embodiment can provide a film with a high visibility of a structural color in a solid state with a simple material composition.

Moreover, in this embodiment, the diameter of the core 21 is adjustable by the thickness of the shell.

The diameter of the core-shell particle is preferably 50 nm or more and 500 nm or less. More preferably it is 100 nm or more and 400 nm or less.

Moreover, in this embodiment, the material of core 21 is preferably at least one of an inorganic material and organic material.

For the inorganic material, it is preferably silica, titania, or alumina.

As an organic material, polymers are preferable. Moreover, a styrenic resin such as polystyrene and acrylic resin such as a polymer which is polymerized of acrylic acid or metacrylic acid are more preferable.

Moreover, in this embodiment, the shell 22 is the material which covers the core 21. By the core and the shell, the high visibility of the structural color can be obtained.

In this embodiment, the thickness of the shell 22 is preferably 0.5 nm or more and 50 nm or less. Moreover, it is more preferably 1 nm or more and 30 nm or less.

In this embodiment, it is preferable that the color of the material of the shell 22 is browner or darker than the material of the core.

Moreover, in this embodiment, it is preferable that a polymer which is made from a dopamine or a dopamine derivative (hereafter referred to as "dopamine polymer") is the material of the shell 22.

Here, "dopamine" means a compound which is shown by the below-mentioned chemical formula.

"Dopamine derivative" means a compound in which a functional group or a substituent is introduced without changing the property of the dopamine.

Here, in the below-mentioned chemical formula, as the functional group or the substituent, it is preferable that X=polymerization-initiating group, sugar chain or coloring matter, and Y=hydroxyl group, methyl group, ethyl group or halogen group.

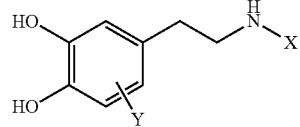

Chem 1

Moreover, in this embodiment, it is preferable that the film 2 has a colloidal crystal structure in which the core-shell particles are regularly arranged, or an amorphous structure in which the core-shell particles are irregularly arranged.

In this embodiment, when the arranged structure of the core-shell particles is a colloidal crystal structure, the incident light is diffracted according to Bragg's law, and the rainbow structural color with angular dependence is exhibited.

The structure is realized when the thickness of the shell is 0.5 nm or more and 10 nm or less, preferably 1 nm or more and 10 nm or less.

Moreover, in this embodiment, by the amorphous structure of the core-shell particles, a monochromatic structural color with non-angular dependence is realized.

Incidentally, the structure is realized when the thickness of the shell is 10 nm or more and 50 nm or less, preferably 10 nm or more and 30 nm or less.

Moreover, in this structure, the color of the light is decided by the diameter of the core-shell particle.

As mentioned above, in the film, the color of the reflected light is adjustable by adjusting the diameter of the core, the thickness of the shell, or the diameter of the core-shell particle.

In this embodiment, it is preferable that the diameter of the core-shell particle is 50 nm or more and 500 nm or less, preferably 100 nm or more and 400 nm or less.

If the diameter is in the above-mentioned region, the visible light can be exhibited as the structural color.

More specifically, when the diameter is 200 nm or more and 230 nm or less, a blue structural color is exhibited. When the diameter is 230 nm or more and 270 nm or less, a green structural color is exhibited. When the diameter is 270 nm or more and 300 nm or less, a red structural color is exhibited.

Moreover, in this embodiment, the product with film 2 which comprises the above-mentioned core-shell particles is applicable for electrical products such as home electric appliances, mechanical products such as cars and the parts of them.

Further, it is also applicable for miscellaneous goods in daily life, clothes, paper products, and wrapping products.

As the material of the product, glass and polymer compounds are preferable in the aspect of forming the film easily and reducing the cost.

Next, a method for producing the product will be explained.

The product can be made by coating a base material with the dispersion, and drying the dispersion.

The method for coating is not limited, but ink-jet method is preferable. The ink-jet method comprises a step of filling the nozzle with the dispersion, and a step of ejecting the dispersion of a prescribed amount from the nozzle.

Incidentally, the solvent of the dispersion is not limited in so far as the core-shell particles can be dispersed. However, water is a preferable example.

Moreover, the amount of the core-shell particles should be adjusted according to the depth of the desired color. Accordingly, the amount of the core-shell particles is not limited.

Moreover, in this embodiment, a method for producing core-shell particles comprises a step of adding dopamine or a dopamine derivative to a solution in which uniform cores are dispersed (hereafter referred to as "polymerization solution"), a step of polymerizing the dopamine or dopamine derivative, and a step of coating the core with the poly-dopamine as a shell layer.

Incidentally, it is preferable that the solvent for the solution for polymerization is water in which a base is added.

Here, the base is used for adjusting the pH. The value of the pH is not limited in so far as the core-shell particles with poly-dopamine shell can be produced.

For example, it is preferable that the pH is 8 or more and 12 or less.

Moreover, in this embodiment, it is preferable that the base is at least one of trishydroxymethylaminomethane (Tris), sodium hydroxide (NaOH), potassium hydroxide (KOH), and ammonia water.

Further, ethanolamine acetate buffer, sodium biphosphate buffer, sodium acetate buffer, sodium borate buffer, potassium borate buffer, or sodium carbonate buffer can be adopted.

Incidentally, Tris is preferable in a point of easily carrying out the pH adjustment.

Moreover, in this embodiment, it is preferable that the amount of the base to be added is 0.5 gram per 1 liter or more and 30 grams per 1 liter or less.

It is more preferable that the amount of the base to be added is 10 grams per 1 liter or more and 18 grams per 1 liter or less.

Moreover, in this embodiment, the amount of the dopamine for adding to the solution for polymerization is not limited so far as the dopamine can be polymerized.

For example, the amount of the dopamine is preferably 0.1 g per 1 liter or more and 4.0 g per 1 liter or less, and more preferable 0.1 g or more and 2.0 g or less.

Moreover, in this embodiment, the temperature for the polymerization of the dopamine is adjustable in consideration of time.

It is preferably 5 degrees or more and 60 degrees or less, and is more preferably 10 degrees or more and 60 degrees or less.

Moreover, in this embodiment, the period for polymerizing dopamine or dopamine derivative is adjustable. 6 hours or more is preferable, and 20 hours or more is more preferable.

If the period is 6 hours or more, it is possible to sufficiently polymerize them and if it is 20 hours or more, it is possible to more sufficiently polymerize them.

As a result, by polymerization of the dopamine, it is possible to produce core-shell particles which comprise a shell of poly-dopamine.

EXAMPLES

The advantageous effects of the present invention were confirmed by actually producing core-shell particles which have a poly-dopamine shell.

Hereafter, the detail will be described.

First, some polystyrenic particle samples were made by soap-free emulsified polymerization. The average diameter of each sample was 221 nm, 237 nm, 264 nm, 285 nm or 287 nm, respectively.

Then, for each sample, water of 1 liter and tris(hydroxymethyl)aminomethane of 12 g were added. Consequently, some solutions for polymerization were made.

Next, at room temperature, dopamine (DA) of 0.1-2.0 g was added to the above-mentioned solutions for polymerization and polymerization had been performed for twenty hours.

As a result, a solution in which core-shell particles which were covered with dopamine of a brown or black color were dispersed was obtained.

Then, the solution was refined by a centrifugal separator.

Figure 4:
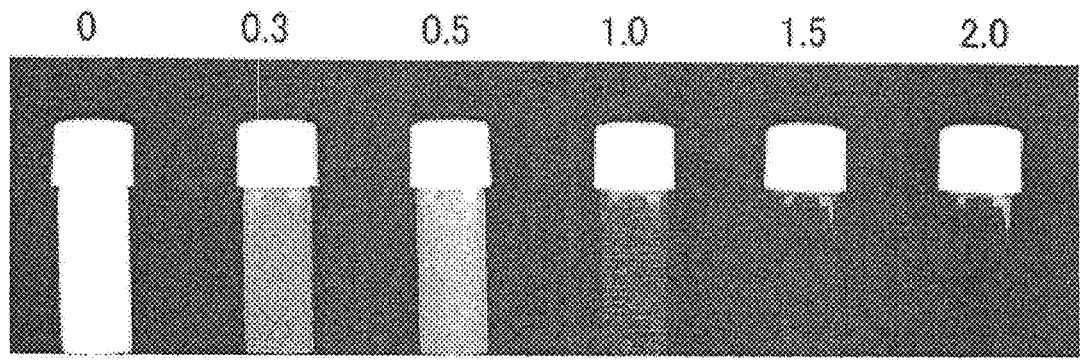
FIG. 4 shows a photographic drawing of an aqueous dispersion which comprises core-shell particles of an example.

FIG. 4 shows a photographic drawing of an aqueous dispersion (the density of the particles is 0.5 wt %) which comprises core-shell particles.

As a result, it was confirmed that the monodispersity of the obtained core-shell particles was high and the diameter of the core-shell particles were uniform.

Especially, it was also confirmed that the thickness of the shell was increased when the amount of addition of dopamine was increased.

Moreover, it was also confirmed that the blackness of the core-shell particle is adjustable by adjusting the density of dopamine.

Further, pellets were made by using the core-shell particles.

Figure 5:
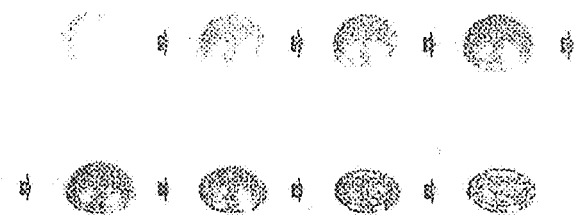
FIG. 5 shows a photographic drawing of a drying process of pellets of the example.

FIG. 5 shows a photographic drawing of a drying process of pellets. In this example, the diameter of the core particle was 221 nm and the density of the dopamine was 0.5 gram per 1 liter.

Moreover, pellets were made by using the core particle of 221 nm, 237 nm, 264 nm, 285 nm, and 287 nm. In the pellets, the density of the dopamine were 0 gram per 1 liter, 0.3 gram per 1 liter, 0.5 gram per 1 liter, 1.0 gram per 1 liter, 1.5 grams per 1 liter, and 2.0 grams per 1 liter.

Figure 6:
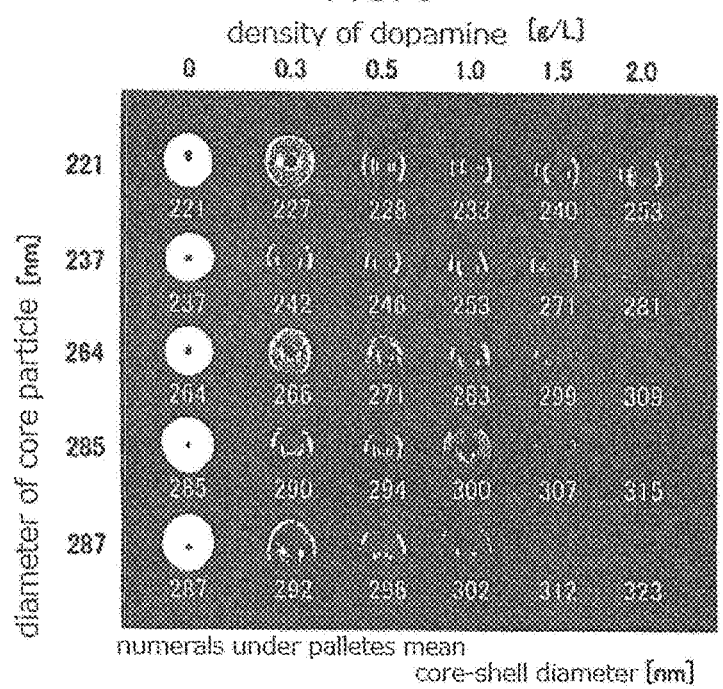
FIG. 6 shows a photographic drawing of the pellets of the example.

FIG. 6 shows a photographic drawing of the pellets. The numeral under each photograph means the diameter of the core-shell particles.

As a result, when the density of the dopamine was 0 gram per 1 liter, the milky white pellet was obtained.

On the other hand, pellets which exhibited a structural color with high visibility were obtained when the density of the dopamine was 0.3 gram per 1 liter, 0.5 gram per 1 liter, 1.0 gram per 1 liter, or 2.0 grams per 1 liter.

It was confirmed that the tone of the structural color was adjustable by adjusting the diameter of the core and the density of the dopamine.

Figure 7:
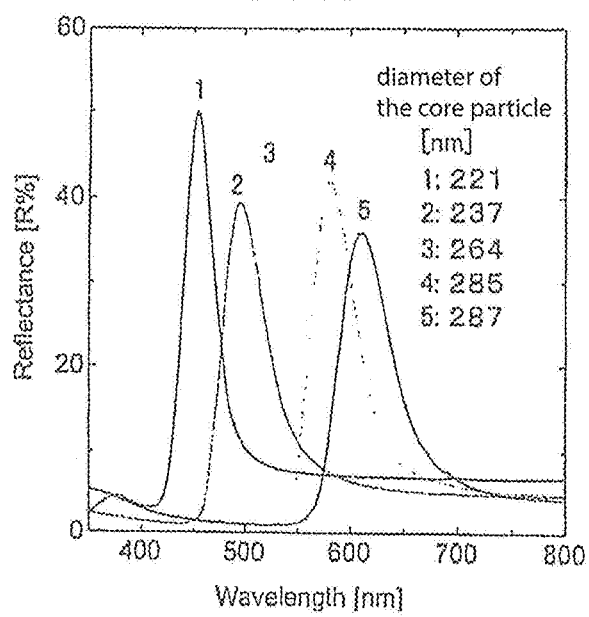
FIG. 7 shows a result of a reflection spectrum of the pellets of the example.

Moreover, next, the reflection spectra of the pellets were observed. The density of the dopamine was 0.5 g per 1 liter, and the diameter of the core particle was 221 nm, 237 nm, 264 nm, 285 nm, or 287 nm, respectively. FIG. 7 shows a result of the reflection spectra of the pellets.

As a result, in a visual aspect and in a reflection spectrum, the structural color was confirmed. Further, it was confirmed that it was possible to obtain many structural colors with a high visibility by adjusting the structure of the core-shell particles.

Moreover, structural colors with an angular dependence were observed in the pellet samples which were made from the samples of which the density is 0 g per 1 liter, 0.3 g per 1 liter or 0.5 g per 1 liter.

FIG. 8 shows a scanning microscope (SEM) image of the pellets and a Fourier translation image of the SEM image.

As a result, a colloidal crystal structure in which the core-shell particles were regularly arranged was confirmed.

Further, by also the diffraction pattern from the Fourier transfer image of the SEM image, the colloidal crystal structure was confirmed.

It was confirmed that a structural color with an angular dependence was exhibited by forming the colloidal crystal structure.

On the other hand, in pellets of 1.0 gram per 1 liter, 1.5 grams per 1 liter, and 2.0 grams per 1 liter, a structural color with a non-angular dependence was confirmed.

FIG. 9 shows a scanning microscope (SEM) image of the pellets of the example and a Fourier translation image of the SEM image.

As a result, an amorphous structure in which core-shell particles are irregularly arranged was confirmed.

Moreover, since a clear diffraction pattern was not obtained in a Fourier image of an SEM image, it was confirmed that an amorphous structure existed.

As a result, it is confirmed that a structural color with a non-angular dependence can be obtained by an amorphous structure.

Incidentally, it is also very important to obtain a structural color in an ink-jet method. Accordingly, a coating experiment using an aqueous solution in which the core-shell particles were dispersed was performed.

In this example, the aqueous solution in which core-shell particles were dispersed was spread on a ink-jet printing paper which was commercially available. In the aqueous solution, the diameter of the core particle was 287 nm and the density of the dopamine was 0.3 gram per 1 liter.

Figure 10:
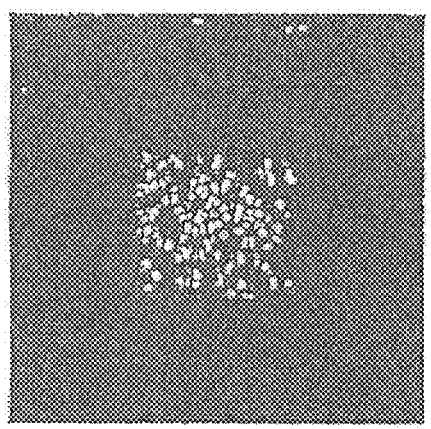
FIG. 10 shows a result of ink-jet coating using the aqueous dispersion which comprises core-shell particles of the example.

Incidentally, FIG. 10 shows a result of ink-jet coating using the aqueous dispersion which comprises core-shell particles. The diameter of the nozzle was 40 micrometers and the size of the coating area was 0.5 cm×0.5 cm.

As a result, a red structural color was confirmed. Namely, it is confirmed that a red structural color could be obtained by an ink-jet method.

Moreover, by using a derivative spectrophotometer, a reflection spectrum measurement in a small region was performed.

Figure 11:
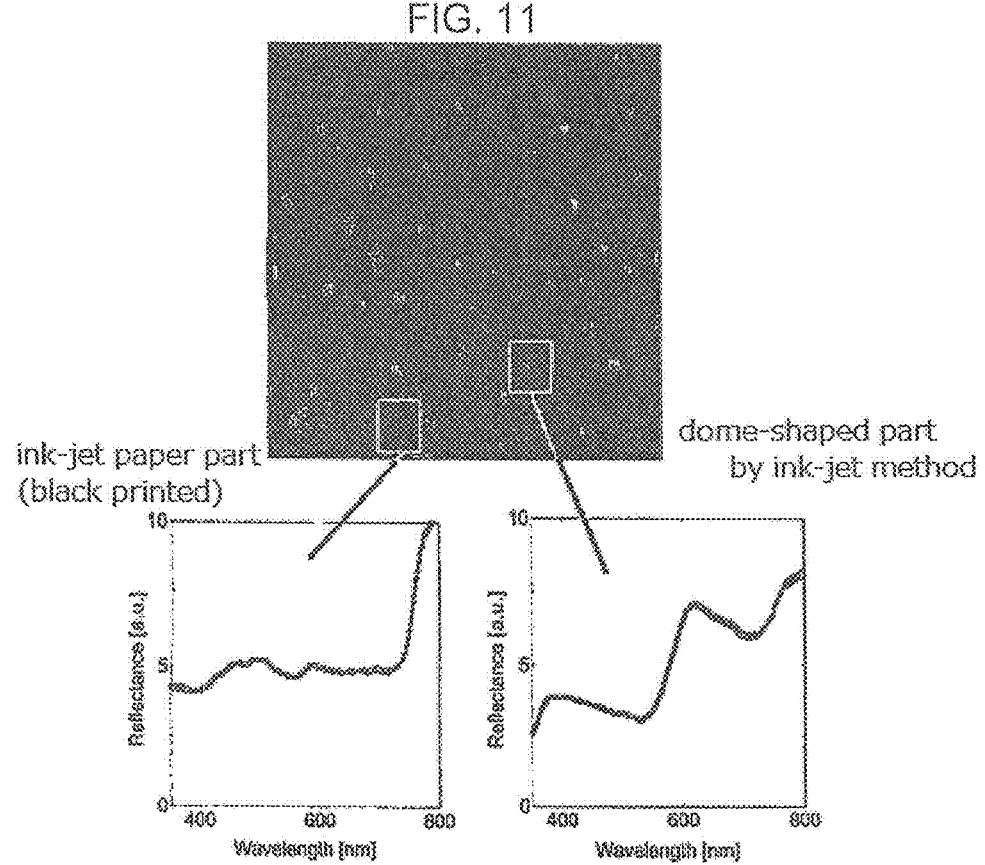
FIG. 11 shows an enlarged photographic drawing of a region which is coated by ink-jet coating in the example, and results of a reflection spectrum of the region which is coated by ink-jet coating and a region of black paper (background).

FIG. 11 shows an enlarged photographic drawing obtained by an optical microscope of a region which was coated by ink-jet coating.

FIG. 11 also shows the results of a reflection spectrum measurement of the region which was coated by ink-jet coating and a region which was blackly printed.

As a result, a reflect spectrum of a red color was obtained in the region of a dome-shaped part which was formed by the ink-jet method. Moreover, a red structural color was confirmed by visual observation.

On the other hand, a clear reflection spectrum was not obtained in the region of black printing.

Consequently, it is confirmed that a structural color appeared in a small region by the ink-jet method.

Figure 12:
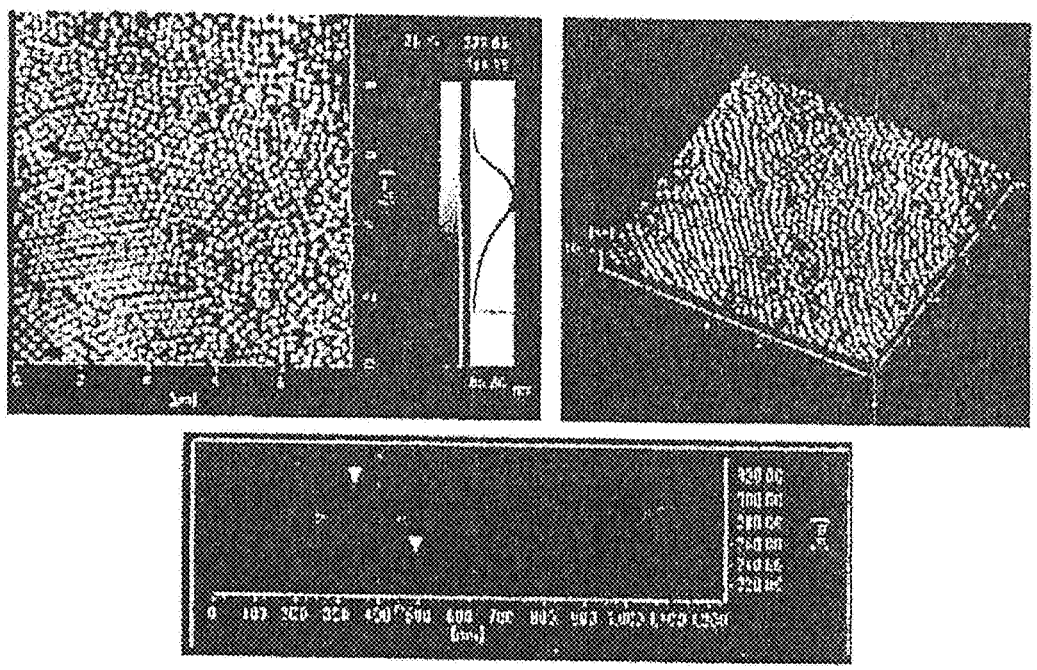
FIG. 12 shows a result of an observation of a dome-shaped region which was made by the ink-jet method of the example.

Moreover, the observation of the dome-shaped part formed by the ink-jet method was performed by using an atomic force microscope (AFM). The result is shown in FIG. 12.

As a result, it was confirmed that the dome-shaped part which was formed by the ink-jet method consists of core-shell particles.

These results provide important knowledge for producing an ink which exhibits a structural color.

From the above, the advantageous effects of the invention were confirmed.

INDUSTRIAL APPLICABILITY

The present invention is industrially applicable for a product having a film which has core-shell particles.

What is claimed is:

1. A structural color product which comprises a base material and core-shell particles, each core-shell particle comprising a core and a shell which covers the core, the product having a colloidal crystal structure and exhibiting a structural color with an angular dependence, in which core-shell particles with a uniform diameter are regularly arranged and the structural color can be observed by light diffraction or interference caused from the regular arrangement of the particles, wherein each core is covered with the shell which comprises a polymer of dopamine or a dopamine derivative which exhibits brown or black colors, the thickness of the shell is 0.5 nm or more and less than 10 nm, and the diameter of the core-shell particles is 50 nm or more and 500 nm or less.

2. A structural color product which comprises a base material and core-shell particles, each core-shell particle comprising a core and a shell which covers the core, the product having an amorphous structure and exhibiting a structural color with a non-angular dependence, in which core-shell particles with a uniform diameter are irregularly arranged and the structural color can be observed by light diffraction or interference caused from the irregular arrangement of the particles,
- wherein each core is covered with the shell which comprises a polymer of dopamine or a dopamine derivative which exhibits brown or black colors,
- the thickness of the shell is more than 10 nm and 50 nm or less, and
- the diameter of the core-shell particles is 50 nm or more and 500 nm or less.

3. The structural color product according to claim 1, wherein the core is made of organic material.

4. The structural color product according to claim 2, wherein the core is made of organic material.

* * * * *